United States Patent [19]

Neasham

[11] 4,118,047
[45] Oct. 3, 1978

[54] VEHICLE TOWING TRAILER

[76] Inventor: Leo B. Neasham, Rte. 2, Box 605L, Highlands, N.C. 28741

[21] Appl. No.: 837,474

[22] Filed: Sep. 28, 1977

[51] Int. Cl.$^2$ ............................................. B62D 53/04
[52] U.S. Cl. ..................................... 280/402; 214/334
[58] Field of Search ........................... 280/402, 476 R; 214/334, 500, 501

[56] References Cited

U.S. PATENT DOCUMENTS

| 2,628,733 | 2/1953 | Hale | 280/402 |
| 3,311,245 | 3/1967 | Galey | 280/402 |
| 3,338,440 | 8/1967 | Donahue | 214/334 |

Primary Examiner—Kenneth H. Betts
Assistant Examiner—R. Schrecengost
Attorney, Agent, or Firm—Karl W. Flocks

[57] ABSTRACT

A motor vehicle towing trailer comprising a main carriage frame having a leading end provided with a hitching member, a trailing end provided with ground engaging wheels on opposite sides thereof, and a support platform on which the front or rear wheels of a motor vehicle to be towed may be supported, the support platform comprising a leading support rod and a trailing support rod extending generally transversely of the carriage frame, and a swivel plate extending beneath the support rods, the support rods being secured to the support plate in the assembled condition thereof with the support plate including structure for selectively securing one of the support rods in a series of different positions from front to rear with respect to the support platform.

5 Claims, 6 Drawing Figures

VEHICLE TOWING TRAILER

BACKGROUND OF THE INVENTION

1. Field of the Invention

The field of the invention is believed to be best exemplified by art which may be found in Class 280, Subclasses 402 and 476 in the United States Patent Office.

2. Description of the Prior Art

This invention was developed as a result of applicant's personal need for a compact and simple trailer device with which antique motor vehicles purchased for his collection may be towed to his home without actual knowledge of the prior art. This application has, however, been prepared subsequently with knowledge of the following prior art U.S. Pat. Nos. 2,411,411 — BLAIR et al, 2,628,733 — HALE, 2,701,069 — HAWKINS, 2,821,410 — LOVE 3,653,680 — DENNY, 3,690,482 — GAUMONT 3,796,328 — KRAGNESS.

Of the art listed the Hale patent is of interest in that it shows a towing dolly comprising a carriage and a wheel support frame pivotally supported thereon. The support frame in the Hale construction is pivotally secured to the axle of the carriage by a pin. The Hale construction also includes a pair of wheel supporting channels that are secured in place by cross members.

The Love patent is of general interest in that it shows details of wheel supports for a trailer.

Hawkins and Denny are of interest in that they show towing trailers with ramps to facilitate vehicle ascent and descent as well as swivel structure.

Gaumont is of interest in that it shows a vehicle towing device including wheel stops.

Blair et al and Kragness are of general interest in that they show other vehicle towing arrangements including means facilitating pivotal motion of the towed vehicle.

SUMMARY OF THE INVENTION

The present invention relates to a new and improved towing construction with which one might tow a motor vehicle from place to place and while its basic purpose is for towing antique cars home from the site of purchase, it, of course, is suitable for use in towing a disabled vehicle to a repair facility. A further feature of the present invention is that it is suitable for hitching-up with a conventional motor vehicle for towing a second vehicle. Upon reading the present specification, the reader will readily appreciate that it is an object of the present invention to provide a trailer for towing motor vehicles which comprises a minimum number of parts which may be readily disassembled for storage and may also be readily assembled for use.

It is also an object of the present invention to provide a new and improved trailer for towing motor vehicles which may be readily altered to accommodate vehicles having different wheel dimensions and/or axle length.

It is a further object of the present invention to provide a towing trailer of simple construction requiring minimum skill to assemble for use.

It is moreover an object of the present invention to provide a towing trailer of low cost, one which a private individual can readily afford in contrast to a "wrecker" such as would be part of the equipment of a commercial garage or service station.

Other objects and advantages of the present invention will be readily discernible to the reader upon closer examination of the following description taken in conjunction with the accompanying drawings.

BRIEF DESCRIPTION OF THE DRAWINGS

Referring briefly to the drawings, the reader will readily visualize the preferred embodiment of the present invention wherein.

DETAILED DESCRIPTION OF THE INVENTION

Figure 4:
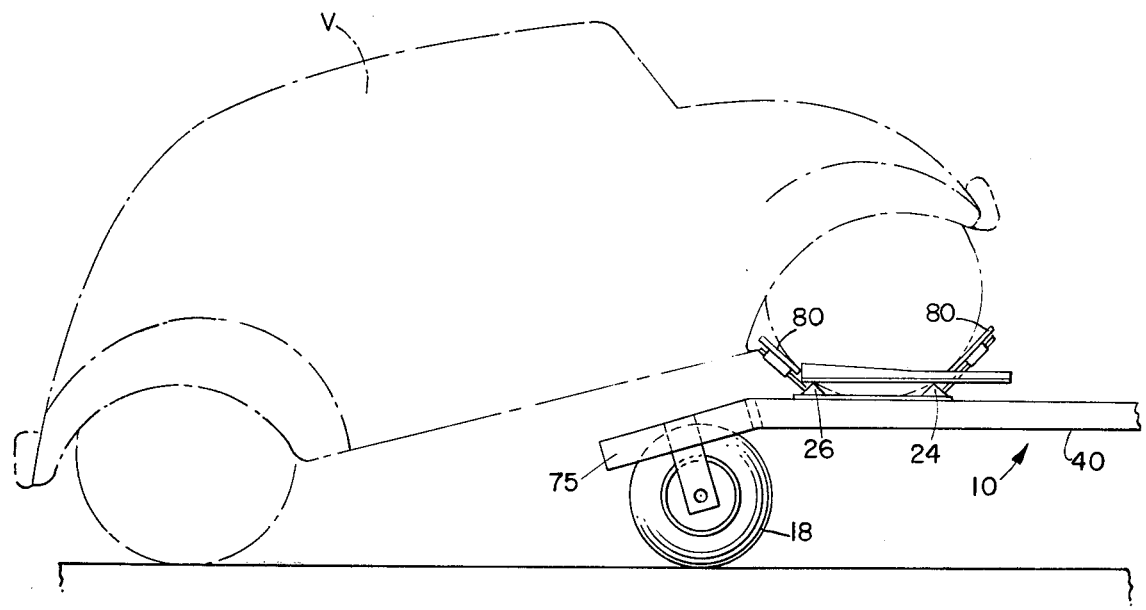
FIG. 4 is side elevational view of a portion of the trailer in FIG. 1 with the front end of a vehicle supported thereon for towing.
Figure 5:
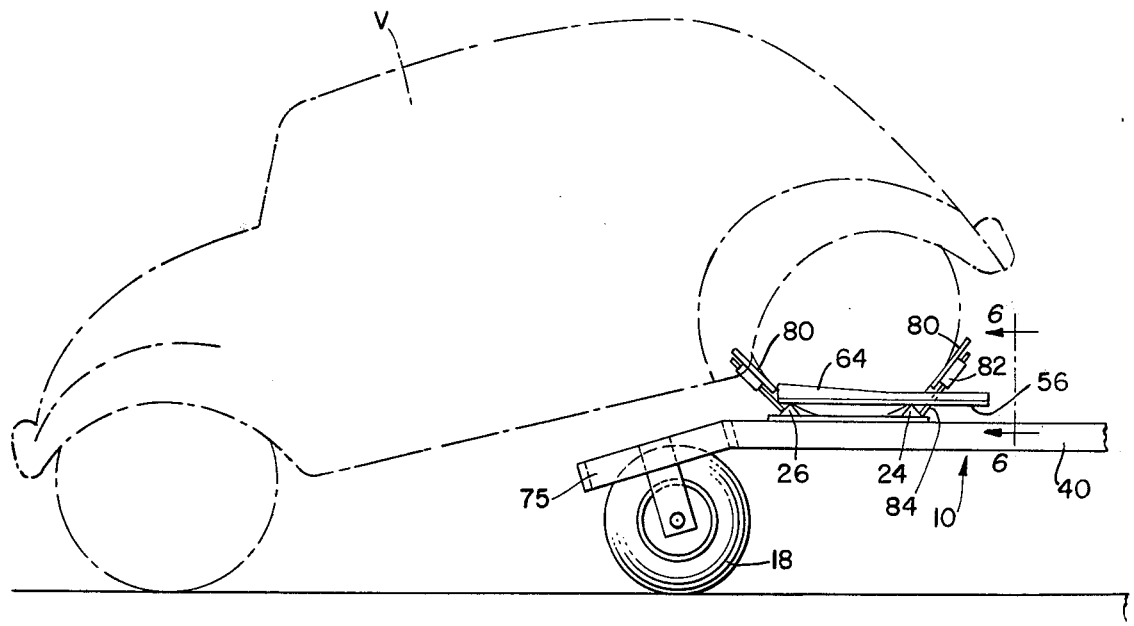
FIG. 5 is a side elevational view of a portion of the trailer of FIG. 1 with the rear end of a vehicle supported thereon for towing.
Figure 6:
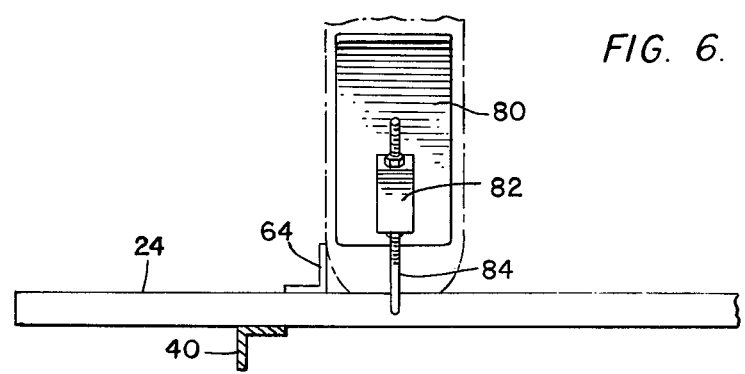
FIG. 6 is a sectional view on an enlarged scale taken along the line 6—6 in FIG. 5.

Referring now to the drawings with greater particularity, the reader will readily see in FIGS. 1-6 that the new and improved motor vehicle towing trailer according to the present invention comprises a main carriage frame 10 having a leading end 12 provided with a hitching member 14, a trailer end 16 provided with ground engaging wheels 18 on opposite sides thereof, and a support platform 20 on which the front or rear wheels of a motor vehicle V, illustrated in phantom, to be towed may be supported. The hitching member 14 is shown as being hitched to a pulling vehicle 22 outlined in phantom lines. The support platform 20 comprises a leading support rod 24 and a trailing support rod 26 extending generally transversely of carriage frame 10 and a swivel support plate 28 extending beneath support rods 24, 26. Support rods 24, 26 are seen to be secured to support plate 28 in the assembled condition thereof with support plate 28 including two rows of upwardly extending threaded studs 30 for selectively securing one of the support rods 24 in a series of different positions from front to rear with respect to support platform 20. Each of the support rods 24, 26 are angle plates of inverted V-shape in cross section, as may be readily seen in FIGS. 1 and 3, and include downwardly extending front and rear sides between which the wheels of a vehicle V to be towed may be disposed in contact relationship with the front side of trailing support rod 26 and the rear side of leading support rod 24 as illustrated in FIGS. 4 and 5.

The leading rod 24, which may be supported on support plate 28 in a series of different positions delineated by two rows of threaded studs 30 extending upwardly from support plate 28 in locations from front to rear of support platform 20, is seen to be disposed between the last two studs 30 of each row and clamped securely by a clamping plate 32 and nuts 34 threaded on studs 30. Nuts 34 are removable to permit shifting support plate 24 and clamping plate 32 to forward or rearward studs 30 depending upon wheel size of the vehicle V to be towed. Trailing support rod 26 is permanently secured to support plate 28 as by being welded thereto, for example.

Carriage frame 10 is generally rectangular and includes an elongate beam 36 extending for the length thereof and intermediate a pair of side beams 38, 40. The intermediate beam 36 is provided with an aperture 42 which accommodates a pivot pin 44 to facilitate swivel action between support platform 20 and carriage frame 10. Pivot pin 44, as may be seen in FIG. 3, extends through aperture 42 of intermediate beam 36 and through an aperture 46 in support plate 28 and further is headed at opposite ends 48, 50 thereof. A coil spring 52 is disposed around pivot pin 44 and extends between the headed portion 48 of pin 44 and the underside of beam 36 to apply a load therebetween whereby a measure of stability is imparted to support platform 20 which in operation is free to pivot about pin 44 with respect to carriage frame 10 in the direction of arrows in FIG. 2 from the solid position to the dotted position, for example.

Support rods 24, 26 are adjustably secured to each other by a pair of angled plates 54, 56 disposed thereover and provided with a series of bolt holes 58, 60, respectively, so that leading support rod 24 may be shifted between relatively forwardly or rearwardly locations. When it is desired to shift support rod 24 to a location between different pairs of studs 30, support rod 24 will be secured by a bolt passing through different bolt holes 58, 60, respectively, which bolt holes, of course, are compatible in spacing from front to rear of angled plates 54, 56 to the spacing between studs 30 from front to rear and with one each of bolt holes 58, 60 being on a line passing intermediate a pair of studs 30. With this arrangement support rod 24 may be secured by bolts through bolt holes 58, 60 in locations between different pairs of studs 30. Each angled plate 54, 56 includes a vertically extending flange portion 62, 64, respectively, to function as a lateral guard or limit for the wheels of a vehicle V to be supported on platform 20 for towing. To accommodate towing vehicles of different axle lengths, the spacing between flange portions 62 and 64 may be varied by shifting plates 54, 56 and securing them by bolts 69 in selected bolt holes 65, 67 provided at different locations along the length of each support rod 24, 26, respectively.

Figure 1:
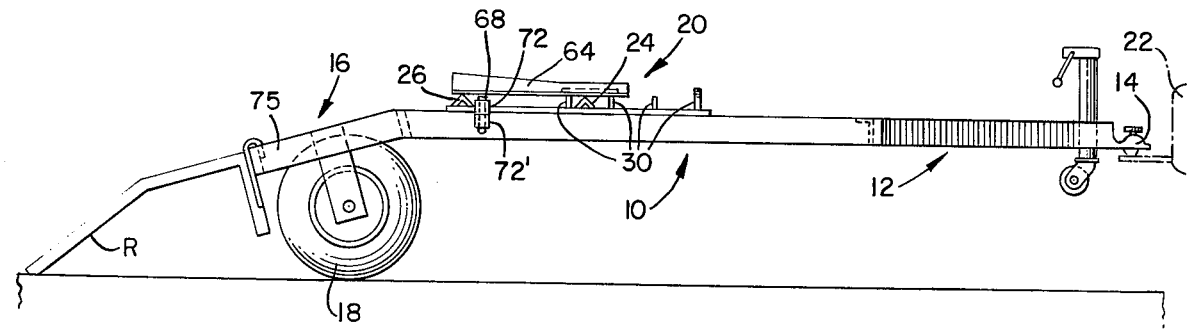
FIG. 1 is a side elevational view of the towing trailer according to the present invention.
Figure 2:
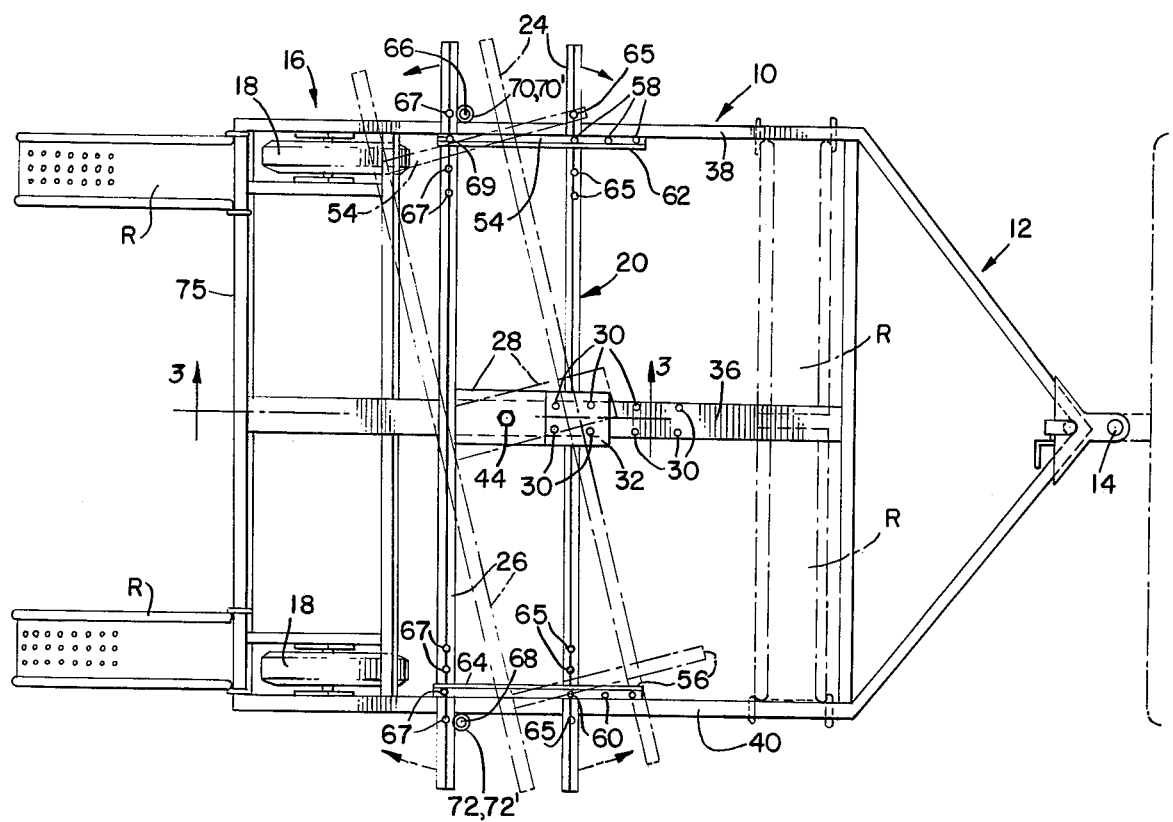
FIG. 2 is a plan view of the trailer of FIG. 1.
Figure 3:
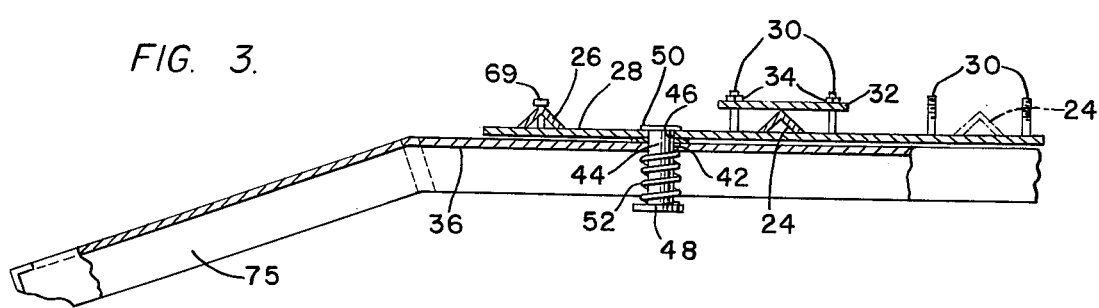
FIG. 3 is a sectional view taken along the line 3—3 of FIG. 2 on an enlarged scale.

To lock support platform 20 against swivel action about pivot pin 44 and with respect to main carriage frame 10, removable latch pins 66, 68 may be inserted into socket sleeves 70, 72 which are secured on support rod 26 and into socket sleeves 70', 72' which are secured on beams 38, 40, respectively, as illustrated in FIGS. 1 and 2. Socket sleeve 70 must be in registration with sleeve 70' and sleeve 72 must be in registration with sleeve 72' to receive pins 66 and 68, respectively, to lock support platform 20 in a fixed position thereby preclude swivel action of support platform 20 about pivot pin 44. Swivel action of platform 20 is permitted during towing operation, but is prevented when a vehicle V is being brought into place on support platform 20 for towing or when it is in the process of being dismounted from support platform 20.

In addition to the swivel action provided by pivot pin 44, carriage frame 10 is in pivotal relationship with the towing or pulling vehicle 22 by reason of a ball and socket arrangement of hitching member 14. Other features of the trailer disclosed herein includes a rearwardly extending, downwardly inclined portion 75 terminating above ground level. Portable ramps R may be placed against or hooked on the end of inclined portion 75 as illustrated in FIGS. 1 and 2 to facilitate ascent and descent of a vehicle V to be towed. When not in use the ramps R may be stored with the lower ends thereof resting on elongate beam 36 and the upper ends hooked over side beams 38, 40.

Removable retaining plates 80 may be secured fore and aft of each wheel disposed between support rods 24, 26 as a precautionary measure. These retaining plates may include a bracket 82 which in turn is secured by a threaded bar 84 attached to support rods 24 and 26 as may be seen in FIGS. 4–6.

It will be obvious to those skilled in the art that various changes may be made without departing from the scope of the invention and the invention is not to be considered limited to what is shown in the drawings and described in the specification.

What is claimed is:

1. A motor vehicle towing trailer comprising a main carriage frame having a leading end provided with hitching means, a trailing end provided with ground engaging wheels on opposite sides thereof, and a support platform on which the front or rear wheels of a motor vehicle to be towed may be supported, said support platform comprising a leading support rod and a trailing support rod extending generally transversely of said carriage frame, and a swivel support plate extending beneath said support rods, said support rods being secured to said support plate in the assembled condition thereof with said support plate including means for selectively securing one of said support rods in a series of different positions from front to rear with respect to said support platform, each of said support rods being angle plates of inverted V-shape in cross section and including downwardly extending front and rear sides whereby the wheels of a vehicle to be towed may be disposed between the front side of said trailing support rod and the rear side of said leading support rod, and said means for securing said one of said support rods in a series of different positions comprising a plurality of rows of threaded studs extending upwardly from said support plate in locations from front to rear of said support platform, and wherein said one of said support rods may be selectively positioned between any desired position between successive studs in each of said rows of threaded studs.

2. The towing trailer according to claim 1 wherein said means for selectively securing said one of said support rods further includes a clamping plate which is selectively shiftable to various positions along with said one of said support rods and a plurality of nuts which are removably threaded on a plurality of said studs over said clamping plate.

3. The towing trailer according to claim 2 wherein the other of said support rods is permanently secured to said support plate as by being welded thereto, for example.

4. The towing trailer according to claim 3 wherein said support rods are secured to each other by an angled plate adjacent opposite ends thereof with angled plates being selectively disposed above said support rods at various positions inwardly from the ends of said support rods to effectively function as guards for wheels of towed vehicles of various axial length.

5. The towing trailer according to claim 4 wherein said support platform and said carriage frame include means for selectively locking each to the other against swiveling action therebetween.

* * * * *